Figure 1:
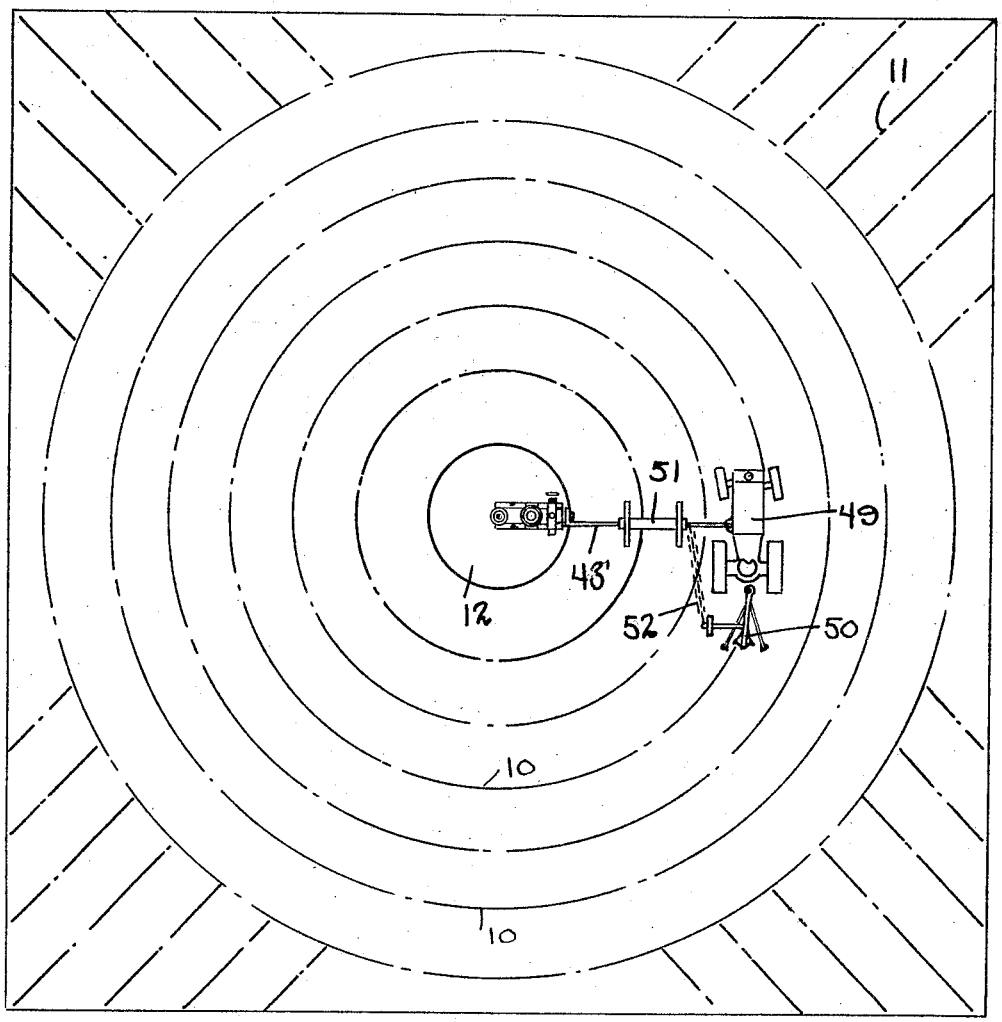

Dec. 25, 1928.  
E. E. GOUCHER  
1,696,352  
AUTOMATIC AGRICULTURAL MACHINE  
Filed Dec. 2, 1926  
3 Sheets-Sheet 1

Elma E. Goucher, Inventor

Witnesses

Dec. 25, 1928.                                              1,696,352
E. E. GOUCHER
AUTOMATIC AGRICULTURAL MACHINE
Filed Dec. 2, 1926        3 Sheets-Sheet 2
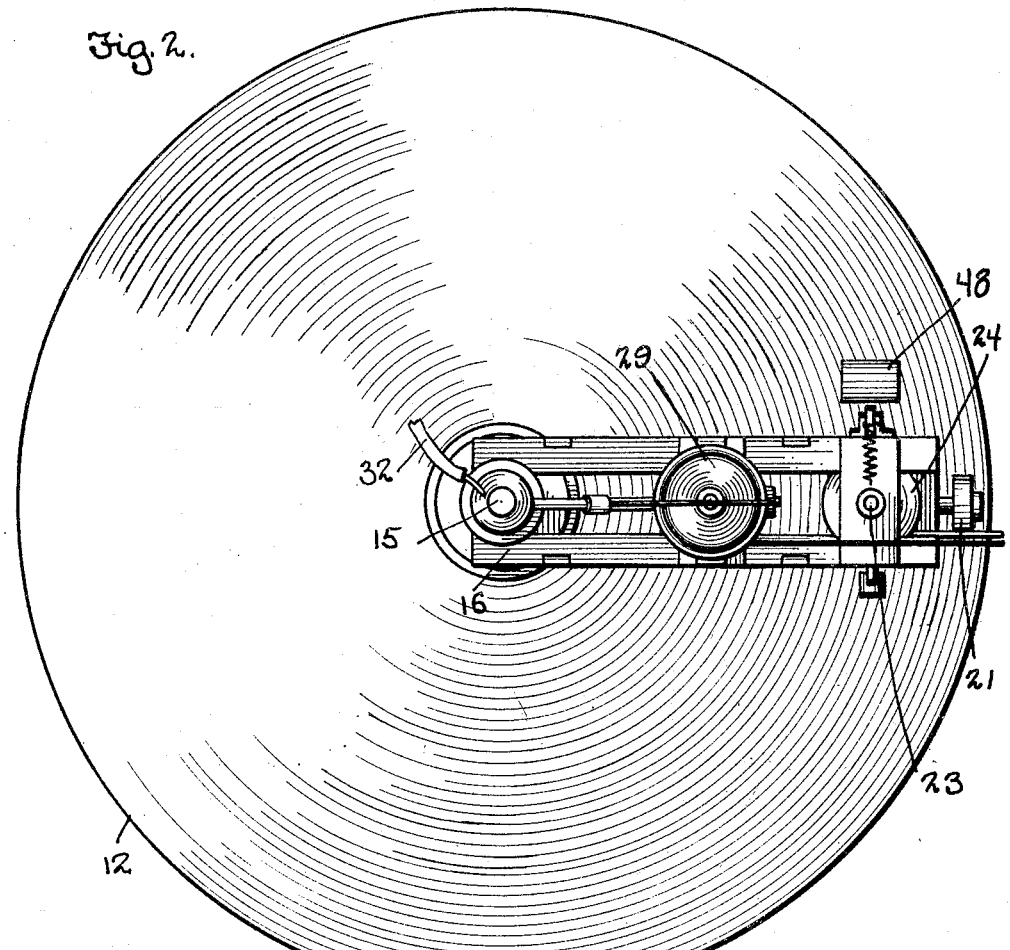
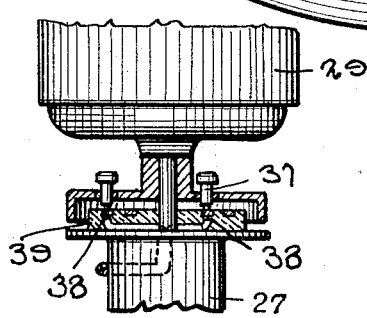
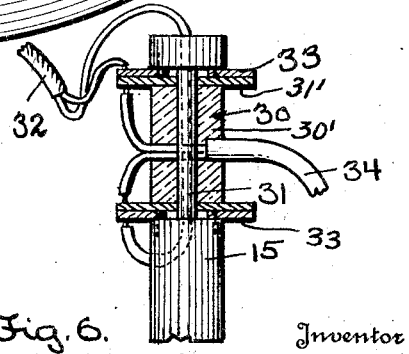
Inventor
Elma E. Goucher

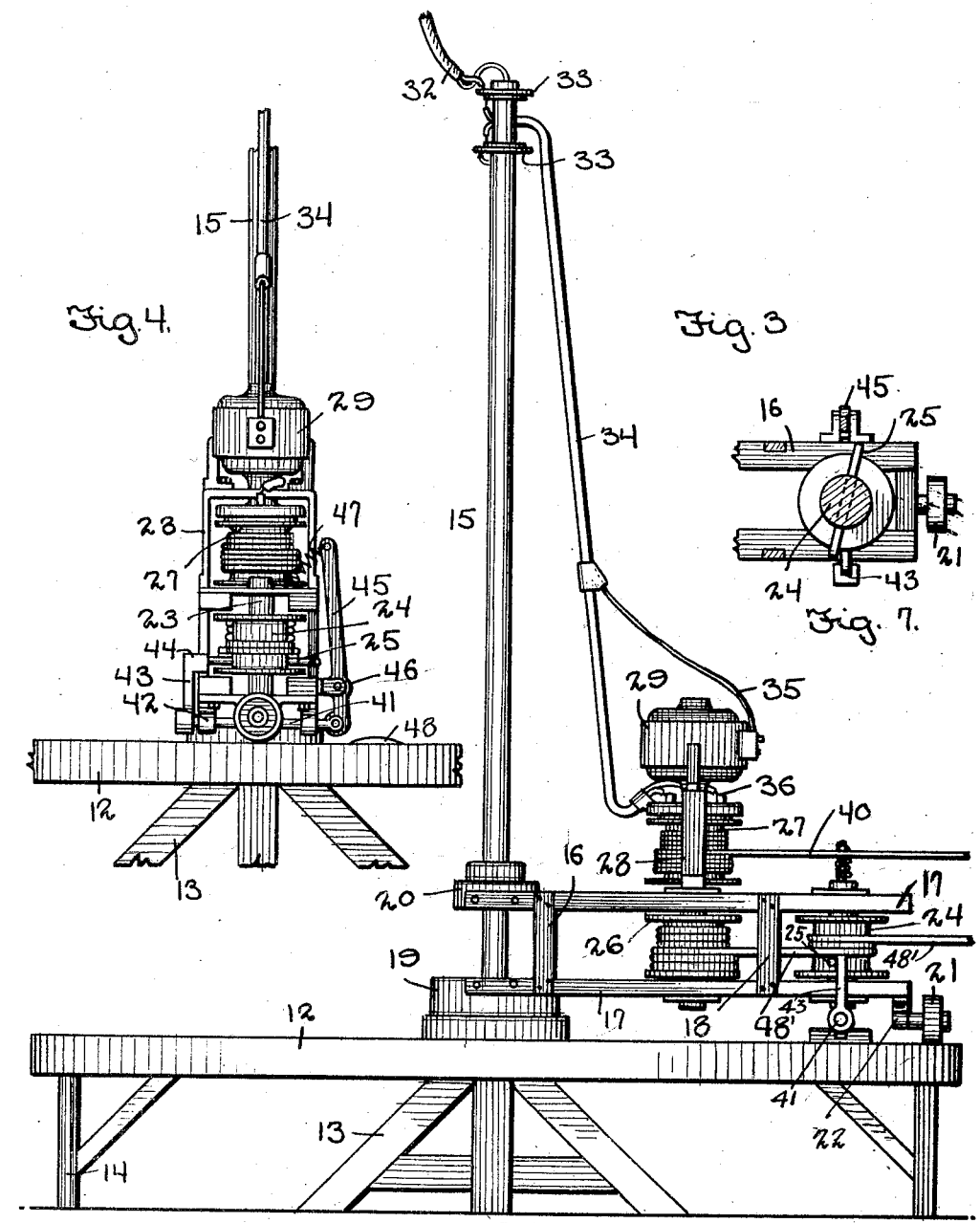

Patented Dec. 25, 1928.

1,696,352

UNITED STATES PATENT OFFICE.

ELMA EVERT GOUCHER, OF McMINNVILLE, OREGON.

AUTOMATIC AGRICULTURAL MACHINE.

Application filed December 2, 1926. Serial No. 152,293.

The present invention relates to improvements in control mechanism for machines, and has particular reference to an apparatus for controlling the operative movement thereof.

An important object of the invention resides in the provision of an apparatus for controlling the movement of and intermittently adjusting the position of a continuously operable agricultural machine.

A further object of the invention is the provision of an apparatus which will permit operative movement of an agricultural machine in a circular path without the attention of an operator.

A still further object of the invention is the provision of an apparatus of the above character whereby an agricultural machine may be continuously operated in a circular movement to describe a continuously and automatically increasing path.

Still another object of the invention is the provision of an apparatus for automatically controlling the operative position of a moving machine designed to vary the radial position of the machine at regular intermittent intervals.

Another object of the invention is the provision of a control apparatus of the above character which is comparatively simple and durable of construction, efficient for the purpose intended, and which can be manufactured at a relatively low cost.

Other objects and advantages of the invention will become apparent as the description progresses.

In the accompanying drawings forming a part of this specification and in which like reference characters are employed to designate corresponding parts throughout the same:

Figure 1 is a top plan view diagrammatically illustrating the manner in which a field is plowed or cultivated with my improved apparatus conventionally indicating the apparatus operatively connected with a tractor drawing an agricultural implement, Figure 2 is a top plan view of the assembled control apparatus constructed in accordance with my invention, Figure 3 is a side elevational view of the same, Figure 4 is a fragmentary front elevational view of the apparatus, Figure 5 is an enlarged fragmentary elevational view illustrating the power transmission mechanism, Figure 6 is a similar view showing the wire carrying structure, and Figure 7 is a horizontal transverse sectional view through the automatic operating mechanism.

Referring to the drawings, wherein for the purpose of illustration is shown the preferred embodiment of my invention, it will be noted that my improved structure embodies a central stationary support about which is rotatively mounted a cable retaining frame. A cable is fixed to the frame and extends radially outward for engagement with a tractor. The tractor is operatively connected with a plow, harrow or other agricultural machine and is set for continuous operation. As is diagrammatically illustrated in Figure 1, wherein is shown a rectangular field, the major portion is cultivated by a series of concentric circular rows 10 by means of the automatic control mechanism. The corners of the field are plowed radially as indicated at 11, by means of a tractor and cultivating machine driven by the operator.

With particular reference to the construction embodied in my invention, I provide a central stationary platform composed of a horizontal circular table 12 supported in an elevated position by means of a central table support frame 13, and a plurality of side supports 14. Rigidly secured in the center of the table and extending upward therefrom is a stationary standard 15.

Arranged for rotatable movement about the lower end of the standard to guide the rotary movement of the tractor, is a control frame 16 composed of a pair of horizontal parallel frame beams 17 of rectangular formation connected by transverse spacers 18. The lower frame beam 17 has its inner end rigidly secured to a comparatively large bearing collar 19, rotatably mounted about the lower end of the standard 15, and positioned in contact with the table. The upper frame beam 17 has its inner end connected with a reduced collar 20 which is also rotatable about the standard to firmly support the frame in horizontal position. The outer end of the rod frame beam 17 carries a rotatable roller 21 mounted on a horizontal shaft secured well in position by a bracket 22. This roller rotates upon the table 12 adjacent the periphery thereof, and durably supports the outer end of the frame.

Rotatably mounted adjacent the outer end of the rotatable frame 16 upon a vertical shaft 23 is a cable receiving drum, 24, a transverse rod 25 being extended through the lower portion of the drum 24 having its ends projecting laterally beyond the sides of the frame.

Mounted on a shaft positioned at the intermediate portion of the frame 16 in parallel position with the drum 24 is an inner complementary drum 26 carrying the main winding of the cable.

Mounted on the upper portion of the shaft in a superimposed position is a third auxiliary drum 27, a U-shaped bracket 28 being secured over the drum 27, to support the shaft in position. Supported in rigid position upon the bracket 28 in alignment with the drums 26 and 27 is an electric motor 29 the purpose of which will become apparent as the description progresses.

Rotatably mounted on the upper end of the standard 15 is a conduit supporting spool 30 rotatable about a central shaft 31. The spool 30 includes a body 30' formed of insulating material and end flanges 31 formed of electric conducting material. An electric conducting cable 32 is firmly secured to flanges 33, which are formed of electric conducting material and arranged in electrical contact with the flanges 31' and the flanges 33 are rigidly secured respectively to the standard 15 and the shaft 31. The conducting wire is then connected to the flanges 31' and is extended through the insulated spool 30. The wires are then connected downwardly as in 34 to provide a motor connection 35 and a pair of tractor feed cables 36. The terminal of the wires 36 contact with conducting rings 38 mounted on the upper face of a circular insulated plate 39 carried by the upper end of the drum 27. An electric feed cable 40 is wound upon the drum 27 and its inner ends project through the drum and contact with the conducting rings 38, the purpose of which will later appear. It is obvious from the foregoing, upon rotation of the frame 16 that the spool 30 will also be rotated due to the connection of the electric wires therewith.

An essential feature of the present construction is the provision of mechanism for automatically tripping the cable bearing drum 24 so that the guide cable will be lengthened at regular intervals to vary the operating path of the tractor. This is effected by a provision of a transversely mounted slidable rod 41 mounted in brackets 42 secured to the lower face of the frame 16. An arm, 43, is rigidly secured to the rear end of the rod 41 and is provided with an inwardly projecting lip 44, normally engageable with one end of the rod 25. Pivotally secured to the forward end of the rod 41 is a fulcrum bar 45 pivotally connected with frame, as at 46, having its upper ends projected in an elevated position and connected with the frame by means of a coiled spring 47. A convex projection 48 is former on the table 12 in position to engage the lower end of the fulcrum bar 45 to trip this bar during each revolution of the frame. From this construction it is obvious that the fulcrum bar 45 will engage the projection 48 once during each revolution of the frame 16 upon the table, causing the rod 41 to be slidably actuated in a rearward position so as to momentarily disengage the lip 44 on the arm 43 from the transverse rod 25. This movement of the trip mechanism will permit a predetermined rotation of the drums 24, 26 and 27 and extension of the cables 48' and 40.

In operation, the cable 48' wound upon the lower parallel drums 24 and 26 is employed as a guide cable which extends radially outward, and is secured to a tractor 49. As diagrammatically illustrated in Figure 1, the tractor 49 is shown drawing a gang plow 50. In order that the guide cable 48' be held in raised position, a wheeled carriage 51 is secured to its intermediate portion, this carriage being particularly provided to prevent the cable contacting with the ground. As shown in Figure 1, the cable 48' is secured to the forward end of the tractor and an auxiliary chain 52 extends from the cable to the gang plow 50 to prevent the plow swinging outwardly out of the path of travel of the tractor.

The control structure is arranged so that the cable 48' is initially adjusted to cause the tractor to describe a circle of comparatively small diameter about the stand 12. The front steering wheels of the tractor are securely fastened at a suitable angular position whereby the forward end of the tractor will have a tendency to pull away from the cable, this tendency of the tractor being overcome by the cable connection. When the tractor has completed its complete circular movement at the initial adjustment of the cable the fulcrum bar 45 will engage the projection 48 secured on the cable and swing the rod 41 and arm 43 forwardly to release the transverse rod 25. Due to the outward pull exerted upon the cable 48', the parallel drum 24 and 26 will be rotated to unwind the cable. The tractor will automatically proceed in a circular path of increased diameter as the bar 45 and the arm 43 will return to their initial positions to prevent further rotary movement of the rod 25 and drum 24. In this manner, the movement of the tractor is regulated to describe a circular path of increasing diameter until the maximum movement is attained. The operator can then readily arrest further progress of the tractor and plow the corners of the field.

The upper auxiliary drum 27 is provided primarily where an electrically propelled tractor is employed, this drum being utilized to carry an electric feed cable 40 connected to the electric operating mechanism.

When the movement of the tractor is completed, the cables 40 and 48' may be quickly wound upon the drums by releasing the arm 43 so as to disengage the rod 25 and rotatively actuating the drums to winding position by means of the motor 29. Then, the device is again in position for operative connection with the tractor.

From the foregoing description, and the drawings, it is apparent that the present construction aims to provide an exceedingly simple and compact structure for automatically controlling the circular movement of a tractor or similar machine. This mechanism will reduce the labor necessary in plowing or similar operation as the control apparatus will automatically regulate the movement thereof. The mechanism chiefly comprises a rotary frame supporting a plurality of drums upon which are wound control cables or guide members to limit the movement of the machine. The entire structure is designed to be readily transported from one field to another and the cable supporting frame is arranged so as to be durably mounted in proper position for use.

It is to be understood that the form of my invention herewith shown and described is to be taken as the preferred example of the same, and that various changes as to the shape, size and arrangement of parts may be resorted to without departing from the spirit of the invention or the scope of the subjoined claims.

Having thus described my invention, I claim:

1. An apparatus of the character described comprising a frame mounted for rotary movement upon a stationary table, a pair of drums mounted for rotary movement on the frame, a cable connected to and wound over the drums adapted to extend radially outward for engagement with a machine, and mechanism operatively associated with one of the drums for automatically releasing the drums for predetermined rotary movement at intermittent periods.

2. An apparatus of the character described comprising a frame mounted for rotary movement upon a stationary support table, a pair of drums mounted for rotary movement on the frame, a guide cable secured to one of the drums and wound upon the drums, the said cable being arranged to project outwardly and connect with a machine, and mechanism operatively associated with the drums for periodically disengaging the drums to permit intermittent extension of the cable.

3. An apparatus of the character described comprising a support table, a vertical standard fixed in the center of the table, a frame mounted for rotary movement on the table, a pair of drums mounted in parallel positions on the frame, a guide cable secured to one of the drums and wound over the drums, the outer end of the cable projecting radially outward and secured to a machine, a mechanism operatively associated with one of the drums adapted to automatically release the drum for rotary movement at predetermined intervals.

4. An apparatus of the character described comprising a horizontal table supported in an elevated position, a vertical standard secured in the center of the table, a frame arranged for circular movement on the table, a drum rotatably mounted in vertical position on the central portion of the frame, a second drum rotatably supported adjacent the outer end of the frame, a cable secured to the central drum and wound thereon, the intermediate portion of the cable being wound about the outer drum and disposed outwardly for the engagement with a machine, and mechanism operatively associated with the outer drum adapted to normally maintain the drum in stationary position and automatically operable to release the drum at predetermined intervals to permit rotary movement of the drums and extension of the cable.

5. An apparatus for controlling the opposite movement of tractors including a horizontal support table, a vertical standard secured in the center of the table, a drum carrying frame comprising a pair of collars mounted for rotary movement on the standard and a pair of radially projecting beams, a roller mounted at the outer end of the frame and rotatable upon the table, a drum mounted in vertical position for rotary movement adjacent the outer end of the frame, a second drum mounted on the intermediate portion of the frame, a cable secured to the inner drum and wound thereon, the intermediate portion of the cable being also wound about the outer drum and projectitng outwardly for connection with a tractor, a rod extended through the lower portion of the outer drum and having its ends projecting laterally therefrom, and trip mechanism adapted to normally secure the drum in stationary position and to periodically release the drum for predetermined rotary movement for extension of the cable.

6. A control apparatus for tractors including a support table, a standard secured in the center of the table extending upward vertically therefrom, a drum carrying frame arranged in a horizontal position on the table provided with bearing collars at its inner ends rotatively mounted upon the standard, a drum mounted for rotatable movement adjacent the outer end of the frame, a second drum mounted adjacent the inner end of the frame, a cable secured to one of the drums and wound about both drums adapted to be extended outwardly and connected to a tractor, a rod extending transversely through the lower portion of the outer drum, a trip mechanism including a fulcrum bar mounted in vertical position on one side of the frame, a transverse rod pivotally connected with the lower end of the fulcrum bar and extended below the frame, an arm rigidly secured to the rear end of the transverse rod, a projection formed on the upper end of the arm engageable with the rod projected through the outer drum, a spring connected to the fulcrum bar adapted to normally maintain the arm in extended position to engage the rod extended through the drum, a projection mounted on the table adapted to engage the fulcrum bar during the circular movement of the frame to trip the arm and permit the rotary movement of the drum and extension of the cable, and means for winding the cable upon the drum.

7. The combination with a power vehicle and an agricultural implement connected therewith, of an automatic control device therefor comprising an extensible connection secured to the vehicle and normally restraining movement of the vehicle in one direction, and means for automatically releasing such mechanism at predetermined intervals.

8. The combination with a power vehicle and an agricultural implement connected therewith, of an automatic control device therefor including a cable connected with the vehicle and normally restraining movement of the vehicle in one direction, and means for automatically releasing a portion of the cable at predetermined intervals.

9. The combination with a power vehicle and an agricultural implement, of an automatic control device therefor comprising an anchored standard around which the vehicle is adapted to travel, a rotatable frame on the standard, an extensible cable acting between the frame and the vehicle, and means for automatically releasing a portion of the cable at predetermined intervals.

10. In combination with a power vehicle and an agricultural implement, of an automatic control for the vehicle comprising an anchoring standard around which the vehicle is adapted to travel, a rotatable frame on the standard, a connection between the frame and the vehicle to normally restrain movement of the vehicle in one direction relative to the standard, means for automatically releasing the connection at predetermined intervals, and means for taking up said connection when the vehicle has reached its limit of travel relative to the standard.

11. In combination with a power vehicle and an agricultural implement connected therewith, of an automatic control device therefor including a standard rigidly secured in place, a frame rotatable on said standard, a cable connected between the frame and vehicle and normally restraining movement of the vehicle in one direction, means for automatically releasing a portion of the cable at predetermined intervals, and means for rewinding the cable after the vehicle has reached its limit of travel relative to the standard.

12. An apparatus of the class described comprising a stationary table, a frame mounted for rotary movement upon the table, a drum rotatably mounted on the frame, a cable connected to and wound upon the drum adapted to extend radially outward from the frame for engagement with a machine, means for normally holding the drum against movement in one direction, and means for automatically releasing the drum for predetermined rotary movement at intermittent periods.

13. An apparatus of the character described comprising a stationary table, a frame mounted for rotary movement upon the table, a drum rotatably mounted on the frame, a cable connected to and wound upon the drum adapted to extend radially outward of the frame for engagement with a machine, means normally holding the drum against movement in one direction, means for automatically releasing the drum for predetermined movement at intermittent periods, and means for permitting positive rotation of the drum in opposite direction for rewinding the table thereon.

In testimony whereof I affix my signature.

ELMA EVERT GOUCHER.